(12) United States Patent
Hatano et al.

(10) Patent No.: US 11,758,283 B2
(45) Date of Patent: Sep. 12, 2023

(54) IMAGE CAPTURE DEVICE AND IMAGE ADJUSTING METHOD

(71) Applicant: Panasonic Intellectual Property Management Co., Ltd., Osaka (JP)

(72) Inventors: Toshinobu Hatano, Kanagawa (JP); Tetsuya Makita, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 17/491,286

(22) Filed: Sep. 30, 2021

(65) Prior Publication Data

US 2022/0021819 A1 Jan. 20, 2022

Related U.S. Application Data

(63) Continuation of application No. PCT/JP2020/007009, filed on Feb. 21, 2020.

(30) Foreign Application Priority Data

Apr. 2, 2019 (JP) ................................ 2019-070554

(51) Int. Cl.
*H04N 23/76* (2023.01)
*H04N 23/71* (2023.01)
*H04N 23/73* (2023.01)

(52) U.S. Cl.
CPC ............. *H04N 23/76* (2023.01); *H04N 23/71* (2023.01); *H04N 23/73* (2023.01)

(58) Field of Classification Search
CPC ........ H04N 23/76; H04N 23/71; H04N 23/73; H04N 23/741; H04N 25/75; H04N 5/202; H04N 5/243; H04N 5/2351; H04N 5/2353
See application file for complete search history.

(56) References Cited

U.S. PATENT DOCUMENTS 9,338,358 B2 * 5/2016 Yoshida ................. H04N 23/71
10,650,504 B2 * 5/2020 Shin ....................... H04N 23/75
(Continued)

FOREIGN PATENT DOCUMENTS

CN 102984461 A 3/2013
JP 06-245151 * 9/1994
(Continued)

OTHER PUBLICATIONS

International Search Report dated Apr. 28, 2020, for the corresponding International Patent Application No. PCT/JP2020/007009, 4 pages. (With English Translation).
(Continued)

*Primary Examiner* — Luong T Nguyen
(74) *Attorney, Agent, or Firm* — Seed IP Law Group LLP (57) ABSTRACT

An image capture device of the present invention is provided with: a first brightness adjusting unit which adjusts brightness when capturing an image of a subject; a second brightness adjusting unit which adjusts the brightness of an analog image signal of the subject captured with the brightness adjusted by the first brightness adjusting unit; an A/D conversion unit which subjects the analog image signal with the brightness adjusted by the second brightness adjusting unit to A/D conversion; a third brightness adjusting unit which adjusts the brightness of a digital image signal obtained by the A/D conversion; and a gain-up adjusting unit which raises the gain of a low-illuminance portion of the digital image signal with the brightness adjusted by the third brightness adjusting unit, by means of realtime modification adjustment using a gamma characteristic.

10 Claims, 4 Drawing Sheets

(56) References Cited

U.S. PATENT DOCUMENTS

| | | |
|---|---|---|
| 2005/0190272 A1 | 9/2005 | Takahashi et al. |
| 2009/0066816 A1 | 3/2009 | Wakagi et al. |
| 2011/0279710 A1* | 11/2011 | Lee .................. H04N 23/72 |
| | | 348/E9.053 |
| 2013/0057745 A1 | 3/2013 | Yoshida |

FOREIGN PATENT DOCUMENTS

| | | |
|---|---|---|
| JP | 2002-33956 A | 1/2002 |
| JP | 2005-244559 A | 9/2005 |
| JP | 2012-119997 A | 6/2012 |
| JP | 2013-55495 A | 3/2013 |
| JP | 2016-66892 A | 4/2016 |
| WO | 2007/108317 A1 | 9/2007 |

OTHER PUBLICATIONS

English Translation of Chinese Office Action, dated Jan. 5, 2023, for Chinese Patent application No. 202080026460.5, (11 pages).
English Translation of Japanese Office Action, dated Feb. 21, 2023, for Japanese Patent Application No. 2019-070554, (4 pages).

\* cited by examiner

IMAGE CAPTURE DEVICE AND IMAGE ADJUSTING METHOD

TECHNICAL FIELD

The present disclosure relates to an image capture apparatus and an image adjustment method.

BACKGROUND ART

In recent years, in the automobile industry, development of sensing technology for realizing autonomous driving has been active. An in-vehicle camera as a typical image information input device is desired to be small and freely attachable anywhere to emphasize a vehicle design. Not only a driver but also a vehicular Electronic Control Unit (ECU) have been capable of visually recognizing and/or detecting the vehicle external condition around the entire perimeter of the vehicle as well as behind the vehicle based on video information of the in-vehicle camera.

Such an in-vehicle camera is further desired to output a high visibility video regardless of day and night. For example, an in-vehicle camera is desired which achieves higher visibility for seeing an obstacle object on a road surface at night that is higher than the visibility by human vision and secures even the visibility for seeing a spot high luminance object such as headlights, so as to allow safety confirmation by the driver visually recognizing an image.

In addition, as a method of widening the dynamic range of input signals, a technique is disclosed in which when defining the dynamic range for signal processing on signals after A/D conversion, a value obtained by multiplying the dynamic range of an AD converter by the ratio of a second high gain to a first low gain for one exposure data is defined as the dynamic range for signal processing (e.g., Patent Literature (hereinafter referred to as "PTL" 1)).

Further, a technique of an image signal processing apparatus for outputting a luminance signal and a color difference signal with a predetermined output bit length from an inputted image signal, the apparatus including: an amplification means for extending a dynamic range of the inputted image signal; a means for calculating an RGB signal based on the image signal having an extended dynamic range; an RGB γ correction means for performing RGB γ correction on the RGB signal to output the RGB signal extended by bit extension in comparison with the output bit length; a conversion means for calculating a luminance signal and a color difference signal based on the RGB signal extended by the bit extension by the RGB γ correction means; and a nonlinear correction means for performing nonlinear correction to fit a calculated output level of the luminance signal in the output bit length is disclosed (e.g., PTL 2).

CITATION LIST

Patent Literature

PTL 1
Japanese Patent Application Laid-Open No. 2002-33956
PTL 2
WO2007/108317

SUMMARY OF INVENTION

Technical Problem

However, above-mentioned PTLs 1 and 2 do not consider to effectively utilize the gamma characteristics with respect to a moving image output of an image capture apparatus, so as to make higher the nighttime visibility in real time than that by human vision.

In view of the above problem, the present disclosure aims to effectively utilize the gamma characteristics with respect to a moving image output of an image capture apparatus, so as to make higher the nighttime visibility in real time than that by human vision.

DESCRIPTION OF EMBODIMENTS

Hereinafter, an image capture apparatus according to an embodiment of the present disclosure will be described.

Configuration of Signal Processing Function of Image Capture Apparatus

Figure 1:
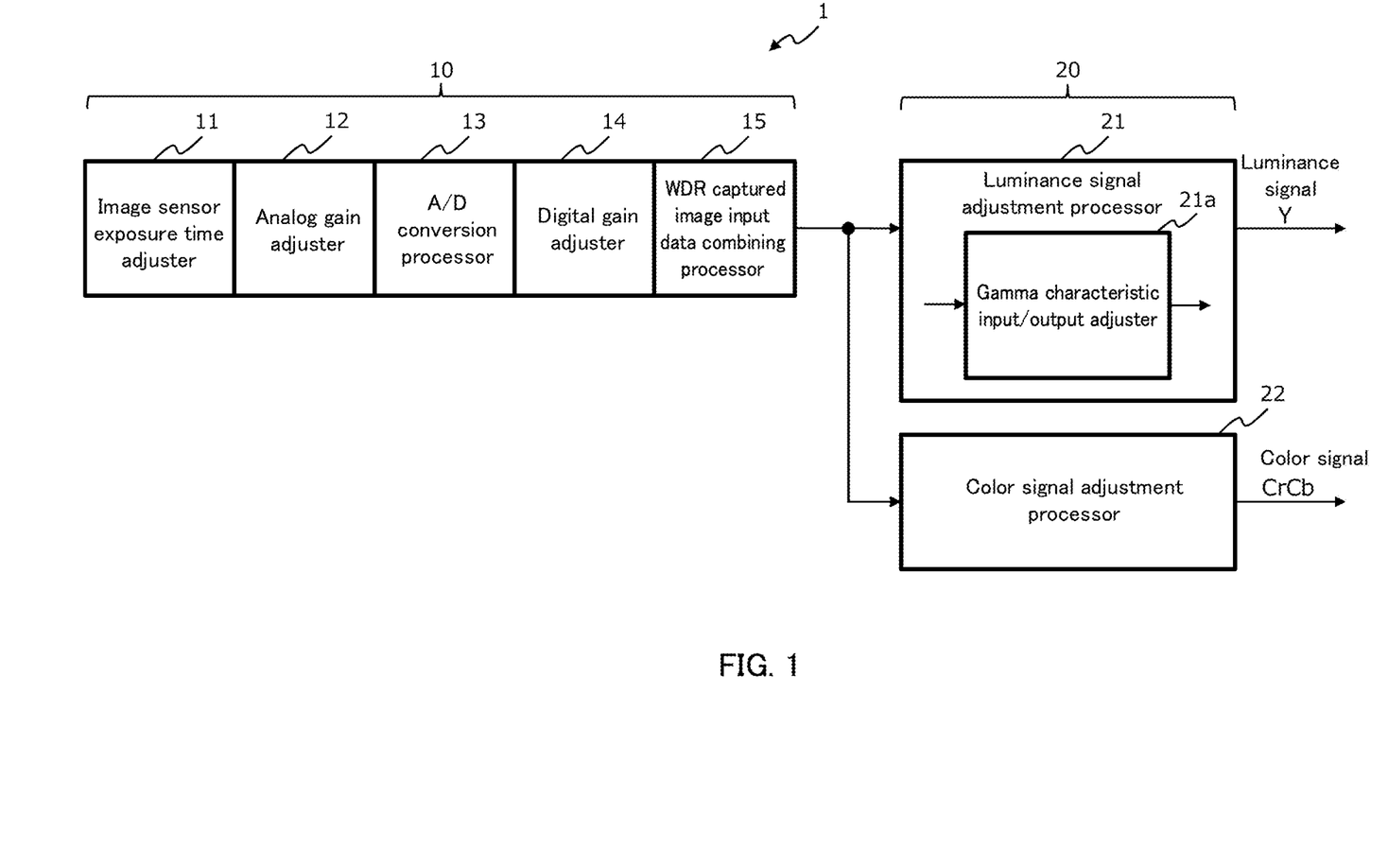
FIG. 1 illustrates a configuration of a signal processing function of a typical image capture apparatus according to an embodiment of the present disclosure.

To begin with, a configuration of a signal processing function of a typical image capture apparatus according to the embodiment of the present disclosure will be described with reference to FIG. 1.

Image capture apparatus 1 includes preprocessor 10 and postprocessor 20. The processor of the present disclosure includes the preprocessor 10 and the postprocessor 20. Preprocessor 10 includes image sensor exposure time adjuster 11, analog gain adjuster 12, A/D conversion processor 13, digital gain adjuster 14, and Wide Dynamic Range (WDR) captured image input data combining processor 15.

The signal processing function of image capture apparatus 1 is a digital camera that converts an analog image signal of an optical image of an object captured via an image sensor into a digital image signal and outputs a luminance signal and a color signal.

The image sensor (not illustrated) disposed in image capture apparatus 1 is a typical image sensor such as an image sensor of a Charge Coupled Device (CCD) type or a Complementary Metal Oxide Semiconductor (CMOS) type.

The analog image signal of the optical image of the object imaged on a light receiving surface of the image sensor is converted into signal charges of amounts corresponding respectively to the amounts of incident light by photodiodes (pixels) arranged two-dimensionally in the image sensor.

Then, the signal charges are sequentially read as voltage signals (image signals) corresponding to the signal charges based on a pulse given by a driver circuit (not illustrated).

Image sensor exposure time adjuster 11 provided in the image sensor has an exposure time adjustment (electronic shutter) function (first brightness adjustment function) for adjusting the charge storage time (shutter speed) for each photodiode (pixel) by a timing control of a shutter gate pulse. The operation of the image sensor (exposure time, readout, and the like) is controlled by a CPU (not illustrated). From the image sensor, the analog image signal is outputted to analog gain adjuster 12.

Analog gain adjuster 12 has a function (second brightness adjustment function) of adjusting the brightness by adjusting the gain of output amplitude of the inputted analog image signal. The analog image signal after adjustment of the brightness is outputted to A/D conversion processor 13.

A/D conversion processor 13 converts the inputted analog image signal into a digital image signal by A/D conversion. The converted digital image signal is outputted to digital gain adjuster 14.

Digital gain adjuster 14 has a function (third brightness adjustment function) of adjusting the brightness by adjusting the output amplitude of the inputted digital image signal.

It is thus possible to cope with an illuminance change in an image capture environment of an object by combining the first brightness adjustment function by image sensor exposure time adjuster 11, the second brightness adjustment function by analog gain adjuster 12, the third brightness adjustment function by digital gain adjuster 14 to adjust the brightness of the image signal.

When the illuminance of the image capture environment of the object is bright, the exposure time is shortened by exposure time adjustment by image sensor exposure time adjuster 11, the analog gain is reduced by analog gain adjuster 12, and the digital gain is reduced by digital gain adjuster 14 in preprocessor 10. It is thus possible to output image data having the brightness of a desired digital data value to postprocessor 20 in the case of the bright illuminance of the image capture environment of the object.

On the other hand, when the illuminance of the image capture environment of the object is dark, the exposure time is lengthened by exposure time adjustment by image sensor exposure time adjuster 11, the analog gain is increased by analog gain adjuster 12, and the digital gain is increased by digital gain adjuster 14 in preprocessor 10. It is thus possible to output image data having the brightness of a desired digital data value to postprocessor 20 in the case of the bright illuminance of the image capture environment of the object.

The image signal (image data) for which the output level is adjusted by the first brightness adjustment function by image sensor exposure time adjuster 11, the second brightness adjustment function by analog gain adjuster 12, the third brightness adjustment function by digital gain adjuster 14 in preprocessor 10 is inputted to WDR captured image input data combining processor 15.

Those conventional image sensors which output, for each frame, an image signal captured in one exposure time was the mainstream; however, wide dynamic range (WDR) compatible sensors, high dynamic range (HDR) compatible sensors, and the like are the mainstream in recent years. A feature of a readout control by such sensors is that two kinds of image signals with different brightness can be outputted in parallel by performing image capture in two kinds of exposure time for each frame.

Further, two of analog gain adjuster 12 and A/D conversion processor 13 are provided, and their adjustment values are set respectively to two different values. It is thus possible to simultaneously output, in parallel, two types of image signals having different brightness.

WDR captured image input data combining processor 15 combines image signals having different brightness simultaneously outputted in parallel so as to generate a composite image signal of a single system, and outputs the composite image signal (composite image data) resulting from the combination to postprocessor (color image processor) 20.

Postprocessor 20 includes luminance signal adjustment processor (gain-up adjuster) 21, color signal adjustment processor 22, and a photometric luminance level detection processor (not illustrated). Adjustment by this postprocessor 20 is controlled by the CPU.

Luminance signal adjustment processor 21 mainly performs various processes such as synchronization processing (processing for calculating the color of each point by interpolation for a spatial deviation in a color signal due to color filter arrangement), gamma correction processing, brightness signal generation processing, contour emphasis processing, and offset level adjustment processing. Further, luminance signal adjustment processor 21 includes gamma characteristic (nonlinear characteristic) input/output adjuster 21a.

Color signal adjustment processor 22 mainly performs various processes such as synchronization processing (processing for calculating the color of each point by interpolation for a spatial deviation in a color signal due to color filter arrangement), white balance (WB) adjustment processing, color gamma correction processing, and color signal adjustment processing.

The photometric luminance level detector performs photometric detection processing for detecting the luminance level of the composite image signal inputted to postprocessor 20. Note that, the photometric detection processing by the photometric luminance level detector may be performed in front of luminance signal adjustment processor 21 or may be performed as processing in luminance signal adjustment processor 21.

Internal Configuration of Luminance Signal Adjustment Processor 21 in Postprocessor 20

Figure 2:
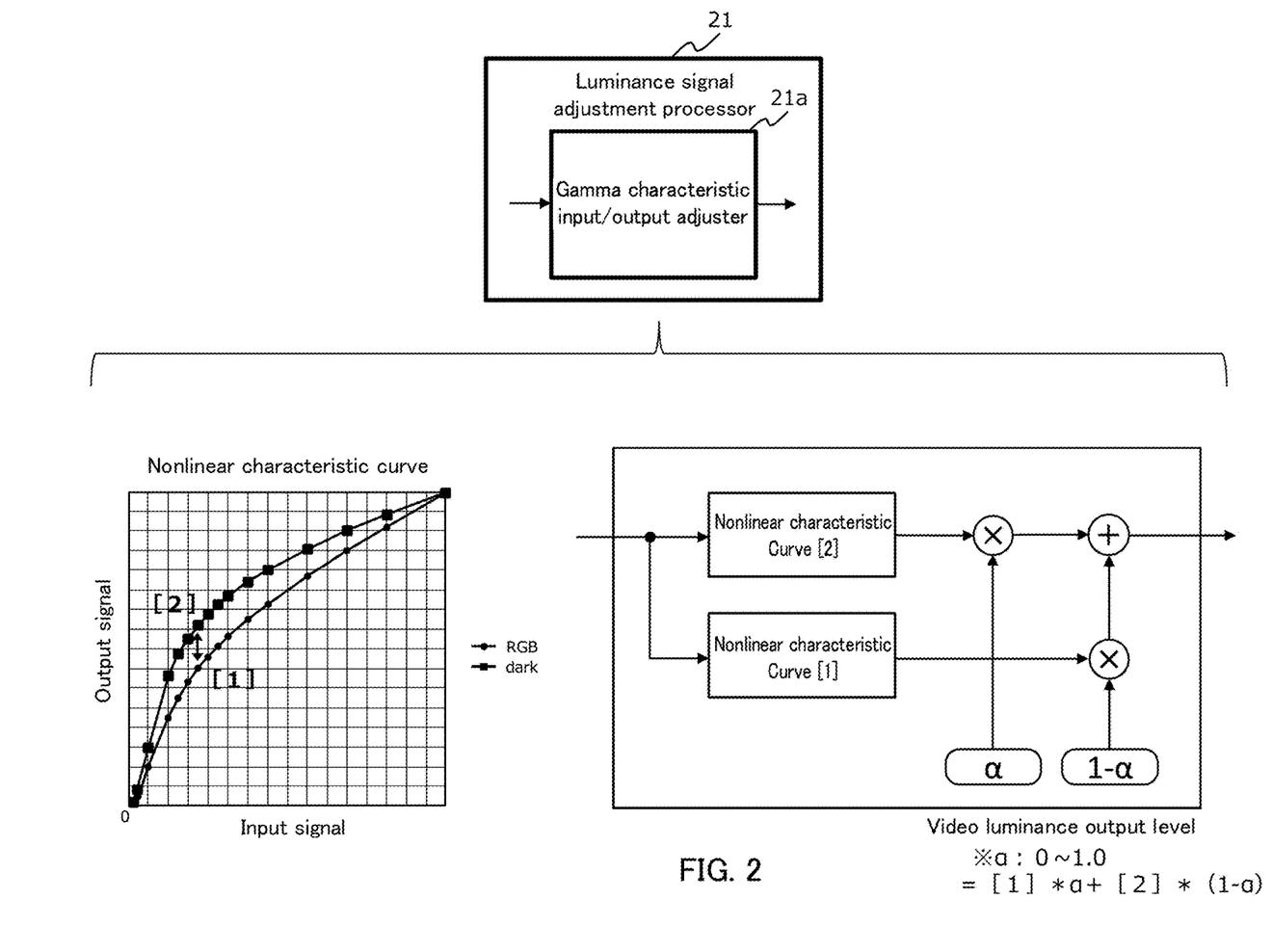
FIG. 2 illustrates an internal configuration of a luminance signal adjustment processor according to the embodiment of the present disclosure.

Next, the internal configuration of luminance signal adjustment processor 21 in postprocessor 20 will be described with reference to FIG. 2.

Image adjustment for the composite image data in postprocessor 20 is performed by gamma characteristic input/output adjuster 21a in luminance signal adjustment processor 21.

Generally, it is possible to output an inputted image signal such that the input value of the inputted image signal has a nonlinear output characteristic, and one type of nonlinear characteristic curve for gamma correction appearing as an arc according to which, of the inputted image data, a low level of image data is heightened and a high level of image data is lowered is provided.

However, the embodiment of the present disclosure includes two types of nonlinear characteristic curves for gamma correction, and thus allows simultaneous parallel processing. A second nonlinear characteristic curve of the two types of nonlinear characteristic curves as compared to a first nonlinear characteristic curve is a nonlinear characteristic curve for gamma correction appearing as an arc according to which a low level of image signal in inputted image data is heightened relatively more than by the first nonlinear characteristic curve, and a high level of image signal in the image data is lowered relatively more than by the first nonlinear characteristic curve.

In real-time change adjustment of nonlinear characteristics using these two types of nonlinear characteristic curves, a configuration is adopted in which mixture processing of mixing two input/output nonlinear characteristic outputs is performed to allow gain-up adjustment for a low illuminance portion by an intermediate nonlinear characteristic between the two types of nonlinear characteristic curves.

For performing the gain-up adjustment in which the intermediate nonlinear characteristic curve between the two nonlinear characteristic curves can be changed, a configuration is adopted in which two nonlinear characteristic results are multiplied respectively by gains and are then added together. Accordingly, the value of α is adjusted by letting the two gain coefficients have the relation of α and 1−α (α: 0 to 1). The adjustment is characterized in that the two gain coefficients of α and 1−α are set such that addition of the coefficients gives 1.

Increase in Gain for Low Illuminance Portion by Mixture Processing of Mixing Two or More Input/output Nonlinear Characteristics Next, increasing the gain for a low illuminance portion by mixture processing of mixing two or more input/output nonlinear characteristics according to the embodiment of the present disclosure will be described with reference to FIG. 3.

Figure 3:
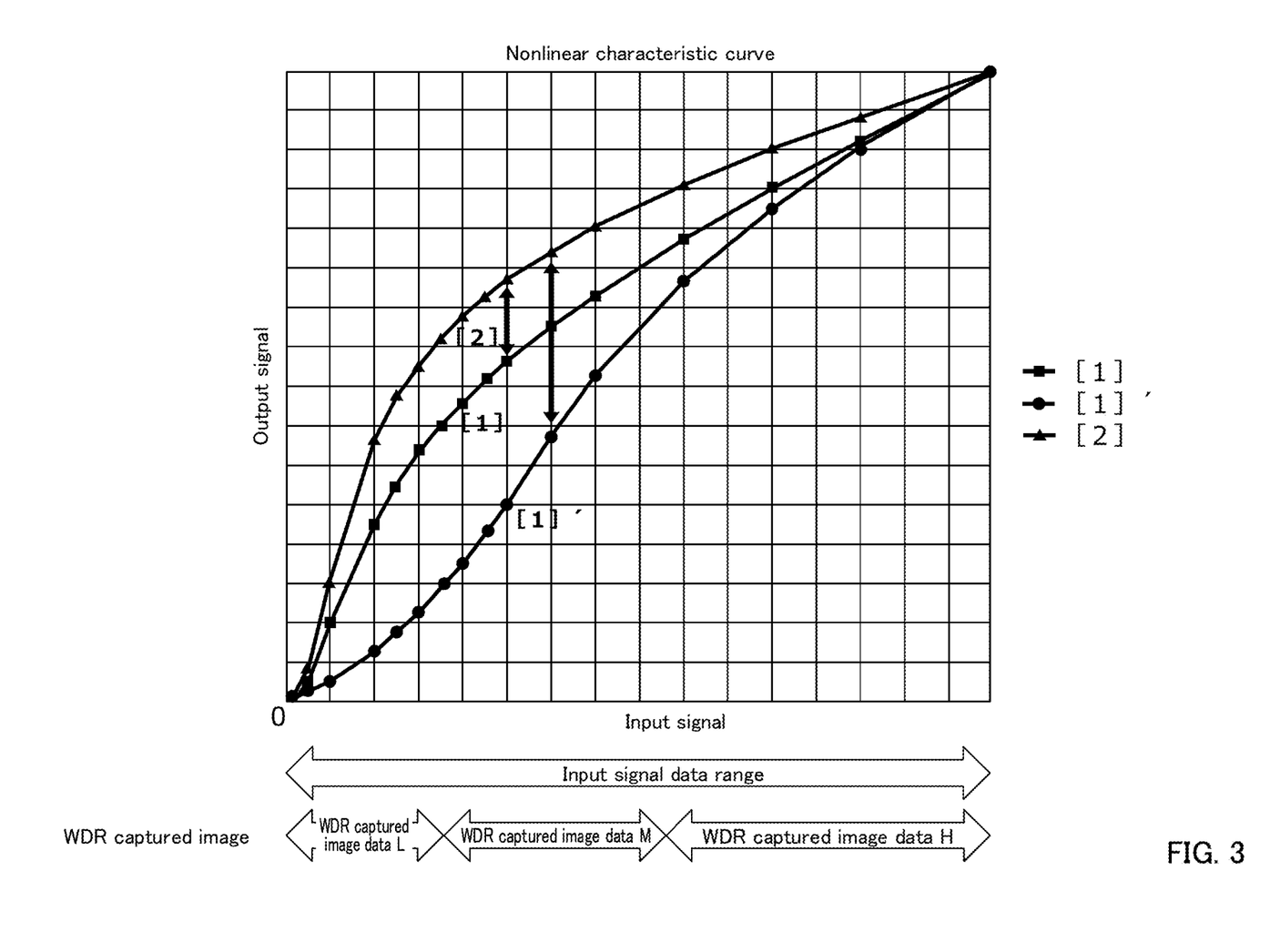
FIG. 3 is an explanatory view for explaining increase in a gain for a low illuminance portion by mixture processing of mixing two or more input/output nonlinear characteristics according to the embodiment of the present disclosure.

In FIG. 3, the gamma characteristic of image data of an image captured during daytime is gamma characteristic [1] or gamma characteristic [1]'. In addition, the gamma characteristic for nighttime in which nighttime visibility is increased by increasing the gain for the low illuminance portion is the nonlinear characteristic of gamma characteristic [2]. The X-axis of this graph indicates an input signal data level, and the Y-axis indicates an output signal data level.

The composite image data resulting from combination of two types of image data having different brightness and outputted from WDR captured image input data combining processor 15 as composite data of a single system is inputted to gamma characteristic input/output adjuster 21a of luminance signal adjustment processor 21.

At that time, the range of an input signal of the composite image data inputted to gamma characteristic input/output adjuster 21a is adjusted and inputted such that its maximum value matches the maximum value of the input signal data range illustrated in FIG. 3.

When a nonlinear characteristic is given to the inputted composite image data, the change in the nonlinear characteristic graph is characterized, for example, by three roughly divided input data ranges: the low illuminance portion (WDR captured image data L (Low)), intermediate illuminance portion (WDR captured image data M (Middle)), and high illuminance portion (WDR captured image data H (High)). The second nonlinear characteristic curve as compared to the first nonlinear characteristic curve has a nonlinear characteristic appearing as an arc according to which, of image data, a low level of image signal is heightened relatively more than by the first nonlinear characteristic curve, and a high level of image signal is lowered relatively more than by the first nonlinear characteristic curve.

Further, α and 1−α (added to yield 1) as the gain coefficients of two of the nonlinear characteristic indicated by [1] and the nonlinear characteristic indicated by [2] are set, and the nonlinear characteristic outputs are multiplied respectively by the gain coefficients and are then added together. It is thus possible to output an intermediate characteristic between the nonlinear characteristic of [1] and the nonlinear characteristic of [2].

Further, by adjusting the gamma characteristic for daytime as [1]', it is possible to output an intermediate characteristic between the nonlinear characteristic of [1]' and the nonlinear characteristic of [2].

In addition, when generating the intermediate characteristic between the two nonlinear characteristics, a smooth change is possible as a change in the image by increasing the coefficient α little by little from 0.

Figure 4:
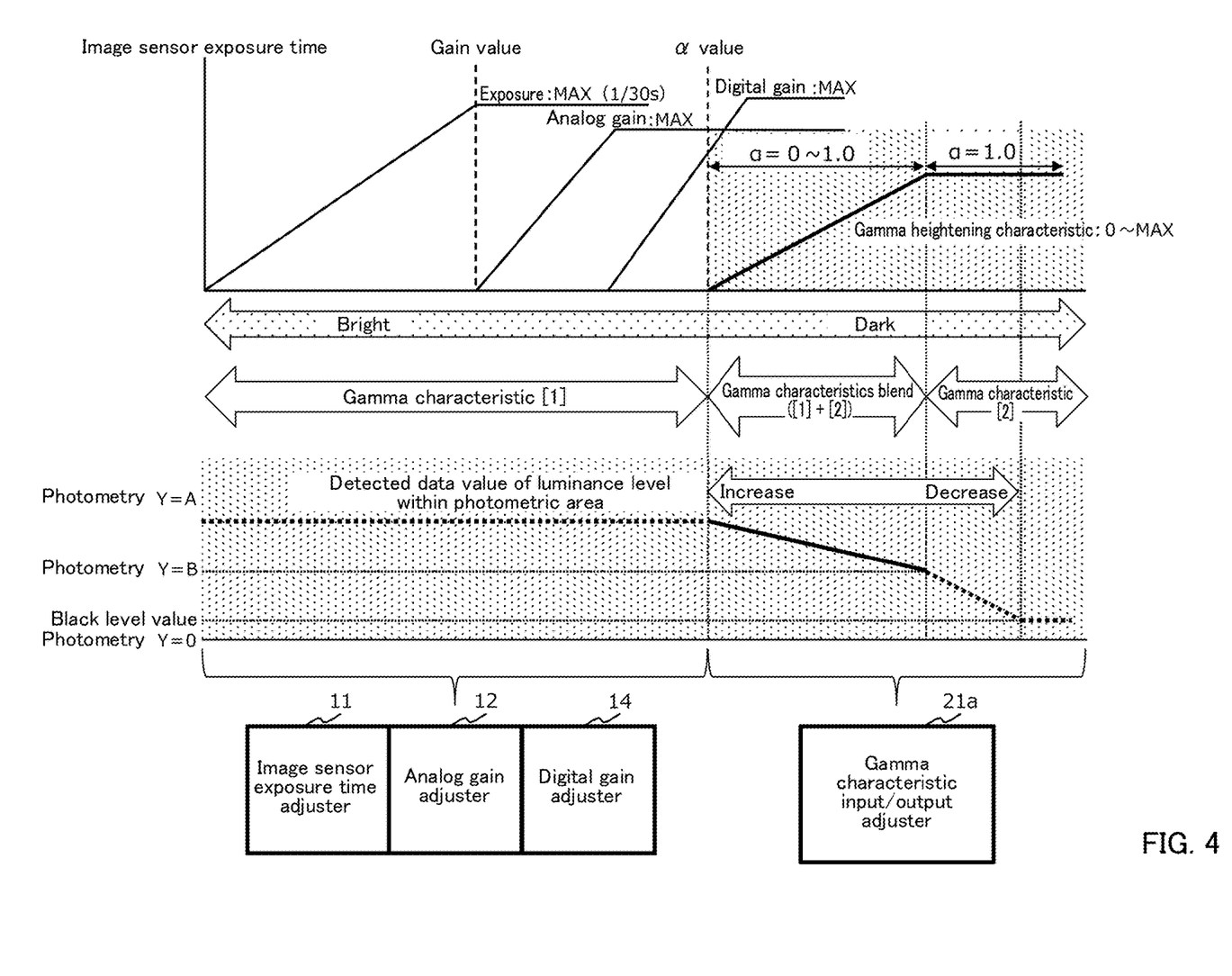
FIG. 4 is an explanatory view for explaining a coordination operation of brightness adjustment functions with respect to environmental illuminance according to the embodiment of the present disclosure.

FIG. 4 is an explanatory view for explaining a coordination operation of the brightness adjustment functions with respect to environmental illuminance according to the embodiment of the present disclosure.

First, a conventional general example of realization of the coordination operation will be described with reference to FIG. 4.

The operation of an automatic brightness adjustment function of image capture apparatus 1 with respect to a change in the environmental illuminance is achieved by the exposure time adjustment function, the analog gain adjustment function, and the digital gain adjustment function of the image sensor in conjunction with one another.

FIG. 4 illustrates the bright state (daytime) of the environmental illuminance on the left and the dark state (nighttime) on the right.

Here, a description will be given of the operation of the automatic brightness adjustment function by a common image capture apparatus during gradual transition of the environmental illuminance from the bright state to the dark state.

First, when it is bright, exposure time adjustment of an image sensor is operated so that the output level of exposure time of the image sensor converges to a desired value. At this time, an analog gain adjustment value is the minimum value, and a digital gain adjustment value is also the minimum value (first state).

As it becomes darker than in the first state, the output level of exposure time of the image sensor comes to 1/30 second (30-fps operation) that is the maximum value. Subsequently, the operation is such that the analog gain adjustment value increases gradually from the minimum value, and the level of the image signal inputted to A/D conversion processor 13 converges to a desired value (second state).

As it becomes darker than in the second state, the exposure time of the image sensor comes to 1/30 second (30-fps operation) that is the maximum value, and the analog gain adjustment value also comes to the maximum value. Subsequently, the operation is such that the digital gain adjustment value increases gradually from the minimum value, and the image signal after A/D conversion by A/D conversion processor 13 converges to a desired value (third state).

As it becomes darker than in the third state, the exposure time of the image sensor comes to 1/30 second (30-fps operation) that is the maximum value, the analog gain adjustment value also comes to the maximum value, and the digital gain adjustment value also comes to the maximum value. Accordingly, the image signal after the A/D conversion does not converge to a desired value. In addition, the signal data approaches a black level value as it becomes further darker (fourth state).

Thus, the common image capture apparatus adjusts the brightness by the coordination operation depending on the first state to the fourth state when the environmental illuminance transitions from the bright state to the dark state.

Conversely, when the environmental illuminance gradually transitions from the dark state (night) to the bright state (daytime), a reverse coordination operation opposite to the above-described coordination operation for the first state to the fourth state is performed.

Specifically, as it becomes brighter from the fourth state, the level of the image signal gradually increases from the black level, and the image signal after A/D conversion approaches a desired value (fifth state).

As it becomes brighter than in the fifth state, the operation is performed such that the digital gain adjustment value is adjusted to gradually decrease from the MAX value, and the image signal after the A/D conversion converges to a desired value (sixth state).

As it becomes brighter than in the sixth state, the operation is performed such that the digital gain adjustment value comes to the MIN value, the analog gain adjustment value then gradually decreases from the maximum value, and the level of the image signal inputted to A/D conversion processor 13 converges to a desired value (seventh state).

As it becomes brighter than in the seventh state, the operation is performed such that the digital gain adjustment value and the analog gain adjustment value come to the MIN values, the exposure time of the image sensor subsequently gradually decreases from the maximum value of 1/30 second (30-fps operation), and the output level of the exposure time of the image sensor converges to a desired value (the eighth state).

As it becomes brighter than in the above-described eighth state, the output level of the exposure time of the image sensor comes to the MIN value, and when it becomes further brighter, the output level of the exposure time of the image sensor approaches a saturation level. In addition, convergence to a desired value becomes impossible, and approaching a white level value takes place. Further, the image signal before or after the A/D conversion also approaches the saturation value (ninth state).

For the adjustment of brightness by the coordination operation of the common camera performed in the above-described first state to the fourth state and in the above-mentioned fifth state to the ninth state, one type of gamma characteristic (nonlinear characteristic), which serves as the present disclosure, is used, and a typical characteristic is the gamma characteristic of [1] illustrated in FIG. 3.

Next, an adjustment method of the present disclosure for achieving the coordination operation will be described with reference to FIG. 4.

To begin with, a description will be given of the operation of the automatic brightness adjustment function during gradual transition of the environmental illuminance from the bright state to the dark state. The operation of the automatic brightness adjustment function performed during gradual transition of the environmental illuminance from the bright state to the dark state is the same as the above-described operations in the first state to the third state.

Next, as it becomes darker than in the fourth state, the output level of the exposure time of the image sensor comes to 1/30 second (30-fps operation) that is the maximum value, the analog gain adjustment value subsequently comes to the maximum value, and the digital gain adjustment value subsequently comes to the maximum value. Accordingly, the image signal after the A/D conversion cannot converge to a desired value. Therefore, as it becomes darker further, the operation of heightening the low illuminance side of an input signal data range of the image signal is performed by mixture processing using two gamma characteristics (nonlinear characteristics) for adjustment for improving the nighttime visibility.

In adjusting the value of $\alpha$ by letting two gain coefficients used have the relation of $\alpha$ and $1-\alpha$ ($\alpha$: 0 to 1) in the above-described mixture processing, the adjustment method of the present disclosure automatically adjusts the value of $\alpha$ by correlating the value of $\alpha$ with the value of luminance level data obtained by the photometric detection processing of the photometric luminance level detection processor.

When the detected luminance level decreases in value from Y=A to Y=B in FIG. 4, $\alpha=0$ is associated with the value of A, and $\alpha=1$ is associated with the value of B. In addition, the detected data value of the luminance level gradually decreasing from A toward B as it becomes further darker is correlated. Thus, it is possible to allow automatic change of $\alpha$ as an increase characteristic that increases from 0 to 1 (MAX value) with respect to a decrease in the detected data value of the luminance level.

Note that, in a case where $\alpha=1$ is associated with the value of A, the detected data value of the luminance level that gradually decreases as it becomes further darker is correlated. It is thus possible to allow automatic change of $\alpha$ of from 1 to the MIN value of 0 as a decrease characteristic that decreases from 1 to 0 (MIN value) with respect to an increase in the detected data value of the luminance level.

Thereafter, as it becomes further darker, the detected data value of the luminance level obtained by the photometric detection processing of the photometric luminance level detection processor approaches the black level value (Y=0).

When the operation is performed with correlation given to the detected data value of the luminance level obtained by the photometric detection processing of the photometric luminance level detection processor, the adjustment is performed such that above-described gain coefficient $\alpha=0$ holds true with respect to the value of the target luminance level, a gradually increases with decreasing target luminance level, and coefficient $\alpha=1$ holds true with respect to any set minimum value.

In addition, when the operation is performed with correlation given to the detected data value of the luminance level obtained by the photometric detection processing of the photometric luminance level detection processor, the adjustment is performed such that above-described gain coefficient $\alpha=1$ holds true with respect to the value of the target luminance level, a gradually decreases with decreasing target luminance level, and coefficient $\alpha=0$ holds true with respect to any set minimum value.

Next, a description will be given of the operation of the automatic brightness adjustment function during gradual transition of the environmental illuminance from the dark state to the bright state.

To begin with, the detected data value of the luminance level gradually rises from the black level value during gradual transition from the darkest state to a brighter state.

When the detected value rises further to a value larger than the value of B, the operation of heightening the low illuminance side of the input signal data range is performed by the mixture processing using two gamma characteristics (nonlinear characteristics) for adjustment for improving the nighttime visibility.

In the above-described mixture processing, the value of $\alpha$ is automatically adjusted by letting the two gain coefficients used have the relation of $\alpha$ and $1-\alpha$ ($\alpha$: 0 to 1) and by correlating the value of $\alpha$ with the value of luminance level data obtained by the photometric detection processing of the photometric luminance level detection processor again.

When the detected luminance level rises in value from Y=B to Y=A in FIG. 4, $\alpha=1$ is associated with the value of B, and $\alpha=0$ is associated with the value of A. In addition, the detected data value of the luminance level gradually increasing from B toward A as it becomes further brighter is correlated. Thus, it is possible to allow automatic change of α as a decrease characteristic that decreases from 0 to 1 (MIN value) with respect to an increase in the detected data value of the luminance level.

Note that, in a case where α=1 is associated with the value of A and α=0 is associated with the value of B, the detected data value of the luminance level gradually increasing as it becomes further brighter is correlated. Thus, it is possible to allow automatic change of α as an increase characteristic that increases from 0 to 1 (MAX value) with respect to an increase in the detected data value of the luminance level.

Thereafter, as it becomes further brighter, the detected data value of the luminance level obtained by the photometric detection processing of the photometric luminance level detection processor becomes a value obtainable in an automatic gain adjustment convergence state achieved using the exposure time adjustment function, the analog gain adjustment function, and the digital gain adjustment function.

Thereafter, as it becomes further brighter, an automatic adjustment coordination operation during the above-described transition from one of the sixth state to the ninth state to another is performed as by the common image capture apparatus.

Notes

An image adjustment method by image capture apparatus 1, in which when electronic shutter (exposure time) adjustment, gain adjustment prior to A/D, and digital gain adjustment subsequent to A/D are performed, it is possible to set a brightness point at which gain coefficient α starts to change, by adjusting a MAX value of a digital gain to any reduced value in order to adjust a brightness level at which real-time change adjustment of input/output nonlinear characteristics using a gamma characteristic function in signal processing with respect to brightness of an object is started.

An image adjustment method by image capture apparatus 1, in which in order to increase the nighttime visibility for seeing an obstacle object on a low illuminance road surface, and to ensure the visibility for seeing a spot high-luminance object such as headlights, object composite data of a plurality of pieces of exposure data obtained based on a plurality of gain settings and exposure settings according to which image capture is performed by a wide dynamic range (WDR) sensor is adjusted to fall within an input signal data range of gamma characteristics (input/output nonlinear characteristics), so as to ensure a gradation within a video signal processing output data range, whereby it is possible to provide image capture apparatus 1 capable of outputting images in which no bright point due to a saturation clip is caused and which has an extremely wide dynamic range of illuminance to ensure visibility.

While various embodiments have been described herein above, it is to be appreciated that various changes in form and detail may be made without departing from the spirit and scope of the invention presently or hereafter claimed.

The disclosure of Japanese Patent Application No. 2019-070554 dated Apr. 2, 2019 including the specification, drawings and abstract is incorporated herein by reference in its entirety.

INDUSTRIAL APPLICABILITY

According to the present disclosure, a technique of effectively utilizing the gamma characteristics with respect to a moving image output of an image capture apparatus, so as to make higher the nighttime visibility in real time than that by human vision can be provided.

REFERENCE SIGNS LIST

1 Image capture apparatus
10 Preprocessor
11 Image sensor exposure time adjuster
12 Analog gain adjuster
13 A/D conversion processor
14 Digital gain adjuster
15 WDR captured image input data combining processor
20 Postprocessor
21 Luminance signal adjustment processor
21a Gamma characteristic input/output adjuster
22 Color signal adjustment processor

The invention claimed is:

1. An image capture apparatus, comprising:
at least one processor that, in operation, performs:
    a first brightness adjustment that adjusts brightness during capture of an image of an object;
    a second brightness adjustment that adjusts brightness of an analog image signal of the object captured with the brightness adjusted by the first brightness adjustment;
    an analog/digital (A/D) conversion on the analog image signal having the brightness adjusted by the second brightness adjustment;
    a third brightness adjustment that adjusts brightness of a digital image signal on which the A/D conversion has been performed; and
    a gain-up adjustment that increases, by real-time change adjustment using a gamma characteristic, a digital gain for a low illuminance portion of the digital image signal for which the brightness has been adjusted by the third brightness adjustment,
wherein:
    the first brightness adjustment is an exposure time adjustment that adjusts exposure time,
    the second brightness adjustment is an analog gain adjustment that adjusts an output amplitude of the analog image signal,
    the third brightness adjustment is a digital gain adjustment that adjusts an output amplitude of the digital image signal, and
    when the first brightness adjustment, the second brightness adjustment, or the third brightness adjustment is performed, the at least one processor sets a brightness point at which a gain coefficient α starts to change by adjusting a value of the digital gain from a maximum value to any reduced value in order to adjust a brightness level at which the real-time change adjustment using the gamma characteristic with respect to brightness of the object is started.

2. The image capture apparatus according to claim 1, wherein
    in a low illuminance state where the digital gain of the digital image signal is in a vicinity of a maximum value, the at least one processor increases the digital gain for the low illuminance portion using an intermediate characteristic resulting from mixture processing that mixes two or more gamma characteristics by the gain-up adjustment.

3. The image capture apparatus according to claim 2, wherein,
    when increasing the digital gain for the low illuminance portion using the intermediate characteristic resulting from the mixture processing that mixes the two or more gamma characteristics, the at least one processor adjusts a value of a by letting two or more gain coefficients have a relation of α and (1−α), wherein α is between 0 and 1 with respect to a configuration of results of the two or more gamma characteristics that are multiplied respectively by gains and are then added together by the gain-up adjustment.

4. The image capture apparatus according to claim 3, wherein,
when the value of a is adjusted by letting the two or more gain coefficients have the relation of α and (1−α), wherein α is between 0 and 1, the at least one processor automatically adjusts the value of α in real time by correlating the value of α with a value of a luminance level obtained in photometric detection processing.

5. The image capture apparatus according to claim 4, wherein,
when the value of a is automatically adjusted in real time by correlating the value of α with the value of the luminance level obtained in the photometric detection processing, the at least one processor sets the two or more gain coefficients such that the gain coefficient α=1 holds true with respect to a value of a target luminance level, a gradually decreases as the target luminance level decreases, and the gain coefficient α=0 holds true with respect to any set minimum value.

6. The image capture apparatus according to claim 2, wherein
the two or more gamma characteristics are settable to any setting.

7. The image capture apparatus according to claim 1, wherein
the at least one processor performs the second brightness adjustment and the A/D conversion by setting adjustment values respectively to two different values, and simultaneously outputs, in parallel, two types of image signals having different brightness,
and performs combination processing that combines the two types of image signals.

8. The image capture apparatus according to claim 7, wherein
the at least one processor adjusts an input signal of composite image data combined by the combination processing such that a maximum value of the input signal matches a maximum value of an input signal data range, and performs the third brightness adjustment by using the input signal adjusted.

9. An image adjustment method, comprising:
performing a first brightness adjustment by adjusting brightness during capture of an image of an object;
performing a second brightness adjustment by adjusting brightness of an analog image signal of the object captured with the brightness adjusted by the first brightness adjustment;
performing analog/digital (A/D) conversion on the analog image signal having the brightness adjusted by the second brightness adjustment;
performing a third brightness adjustment by adjusting brightness of a digital image signal on which the A/D conversion has been performed; and
performing a gain-up adjustment by increasing, by real-time change adjustment using a gamma characteristic, a digital gain for a low illuminance portion of the digital image signal for which the brightness has been adjusted by the third brightness adjustment;
wherein:
the first brightness adjustment includes adjusting an exposure time,
the second brightness adjustment includes adjusting an output amplitude of the analog image signal,
the third brightness adjustment includes adjusting an output amplitude of the digital image signal, and
when the first brightness adjustment, the second brightness adjustment, or the third brightness adjustment is performed, a brightness point at which a gain coefficient α starts to change is set by adjusting a value of the digital gain from a maximum value to any reduced value in order to adjust a brightness level at which the real-time change adjustment using the gamma characteristic with respect to brightness of the object is started.

10. An image capture apparatus, comprising:
at least one processor that, in operation, performs:
a first brightness adjustment that adjusts brightness during capture of an image of an object;
a second brightness adjustment that adjusts brightness of an analog image signal of the object captured with the brightness adjusted in the first brightness adjustment;
an analog/digital (A/D) conversion on the analog image signal having the brightness adjusted in the second brightness adjustment;
a third brightness adjustment that adjusts brightness of a digital image signal on which the A/D conversion has been performed; and
a gain-up adjustment that increases, by real-time change adjustment using a gamma characteristic, a gain for a low illuminance portion of the digital image signal for which the brightness has been adjusted in the third brightness adjustment,
wherein:
the at least one processor performs the second brightness adjustment and the A/D conversion by setting adjustment values respectively to two different values, and simultaneously outputs, in parallel, two types of image signals having different brightness,
and performs combination processing that combines the two types of image signals.

* * * * *